United States Patent
Dai et al.

(10) Patent No.: US 9,674,309 B2
(45) Date of Patent: **\*Jun. 6, 2017**

(54) DATA SHARING

(71) Applicant: International Business Machines Corporation, Armonk, NY (US)

(72) Inventors: Hai Bin Dai, Shanghai (CN); Xiao Feng Yu, Shanghai (CN); Ling Zhang, Shanghai (CN)

(73) Assignee: International Business Machines Corporation, Armonk, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/294,944

(22) Filed: Oct. 17, 2016

(65) Prior Publication Data
US 2017/0094031 A1 Mar. 30, 2017

Related U.S. Application Data

(63) Continuation of application No. 14/865,139, filed on Sep. 25, 2015.

(51) Int. Cl.
*H04L 29/08* (2006.01)
*H04L 29/06* (2006.01)

(52) U.S. Cl.
CPC .......... *H04L 67/42* (2013.01); *H04L 67/10* (2013.01); *H04L 67/02* (2013.01); *H04L 67/22* (2013.01)

(58) Field of Classification Search
CPC ........ H04L 67/42; H04L 67/10; H04L 67/02; H04L 67/22
See application file for complete search history.

(56) References Cited

U.S. PATENT DOCUMENTS

| | | | |
|---|---|---|---|
| 6,847,981 B2 | 1/2005 | Song et al. | |
| 7,647,404 B2 | 1/2010 | Cooper et al. | |
| 7,793,343 B2 | 9/2010 | Timmerman | |
| 7,941,533 B2 * | 5/2011 | Miller | G06F 21/41 709/217 |
| 8,635,522 B2 | 1/2014 | Lee et al. | |
| 8,910,115 B2 | 12/2014 | Reddy et al. | |
| 8,924,921 B2 | 12/2014 | Rush et al. | |
| 2003/0018825 A1 | 1/2003 | Johnson, Jr. et al. | |

(Continued)

FOREIGN PATENT DOCUMENTS

| | | |
|---|---|---|
| CN | 103095661 A | 5/2013 |
| WO | 2006111401 A2 | 10/2006 |

OTHER PUBLICATIONS

Erickson Sr. et al., "Best Practices in Cross-Platform App Development", Harman Innovation Hub, Jun. 29, 2015, http://harmaninnovation.com/blog/best-practices-cross-platform-app-development/, pp. 1-3.

(Continued)

*Primary Examiner* — Arvin Eskandarnia
(74) *Attorney, Agent, or Firm* — Kristofer L. Haggerty

(57) ABSTRACT

Embodiments of the present invention may share common data among multiple servers. According to one embodiment of the present invention, a code segment is obtained at a first server from a client in response to the client interacting with a first application hosted on the first server, where the code segment is associated with business logic in the first application. Then, the first application is executed based on the code segment.

1 Claim, 4 Drawing Sheets

(56) References Cited

U.S. PATENT DOCUMENTS

| | | |
|---|---|---|
| 2003/0158949 A1* | 8/2003 | Miller .................... G06F 21/41 709/229 |
| 2005/0160104 A1 | 7/2005 | Meera et al. |
| 2006/0235935 A1* | 10/2006 | Ng .................... G06F 17/30867 709/208 |
| 2007/0185986 A1 | 8/2007 | Griffin et al. |
| 2010/0107234 A1 | 4/2010 | Aldor et al. |
| 2012/0096068 A1 | 4/2012 | Canning et al. |
| 2013/0276070 A1 | 10/2013 | Lee |
| 2014/0201838 A1 | 7/2014 | Varsanyi et al. |
| 2014/0282872 A1 | 9/2014 | Hansen et al. |

OTHER PUBLICATIONS

Kuptiev et al., "Optimizing the Developer and User Experiences for Cross-Platform Application", Intel IT White Paper, Mar. 2014, pp. 1-7.

Wikipedia, the free encyclopedia, "JavaScript engine", https://en.wikipedia.or/wiki/JavaScript_engine, printed on Sep. 16, 2015, pp. 1-6.

IBM: List of IBM Patents or Patent Applications Treated as Related (Appendix P), Oct. 31, 2016, pp. 1-2.

Dai et al., U.S. Appl. No. 14/865,139, filed Sep. 25, 2016, titled: "Data Sharing", pp. 1-31.

Dai et al., U.S. Appl. No. 15/067,366, filed Mar. 11, 2016, titled "Data Sharing", pp. 1-28.

Dai et al., U.S. Appl. No. 15/294,934, filed Oct. 17, 2016, titled "Data Sharing", pp. 1-29.

* cited by examiner

DATA SHARING

BACKGROUND

With developments of computer and network technologies, online services now provide great support in every aspect of people's life. In many industries, more and more service providers begin to provide online services via Web applications in their websites, and thus users can access to these online services via network instead of visiting the providers' offices personally.

The online services cover multiple aspect of the service provider and are usually supported by different Web application. For example, for a telecommunication provider, there may be separate Web applications for user management, credit management and the like. Although these Web applications are integrated into one website, these Web applications are usually developed by different software companies and possibly written in different programming languages. For example, the Web application for user management on Server A is written in Java™ by Company A, and the Web application for credit management on Server B is written in C++ by Company B. As both of these Web applications follow the business logic in the telecommunication company, these Web applications are possibly dependent if common business logic is shared between these Web applications. When the common business logic changes, additional time and effort are required for the engineers in each of Companies A and B so as to modify the code in each Web applications.

SUMMARY

In one aspect of the present invention, a computer-implemented method is proposed. According to the method, a code segment is obtained at a first server from a client in response to the client interacting with a first application hosted on the first server, where the code segment is associated with business logic in the first application. Then, the first application is executed based on the code segment.

In another aspect of the present invention, a computing system is proposed. The computing system comprises a computer processor coupled to a computer-readable memory unit, the memory unit comprises instructions that when executed by the computer processor implements a method. In the method, a code segment is obtained at a first server from a client in response to the client interacting with a first application hosted on the first server, where the code segment is associated with business logic in the first application. Then, the first application is executed based on the code segment.

In yet another aspect of the present invention, a computer program product is proposed. The computer program product is tangibly stored on a non-transient machine readable medium and comprises executable instructions which, when executed on an electronic device, cause the electronic device to: obtain, at a first server, a code segment from a client in response to the client interacting with a first application hosted on the first server, the code segment being associated with business logic in the first application; and execute the first application based on the code segment.

It is to be understood that the summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
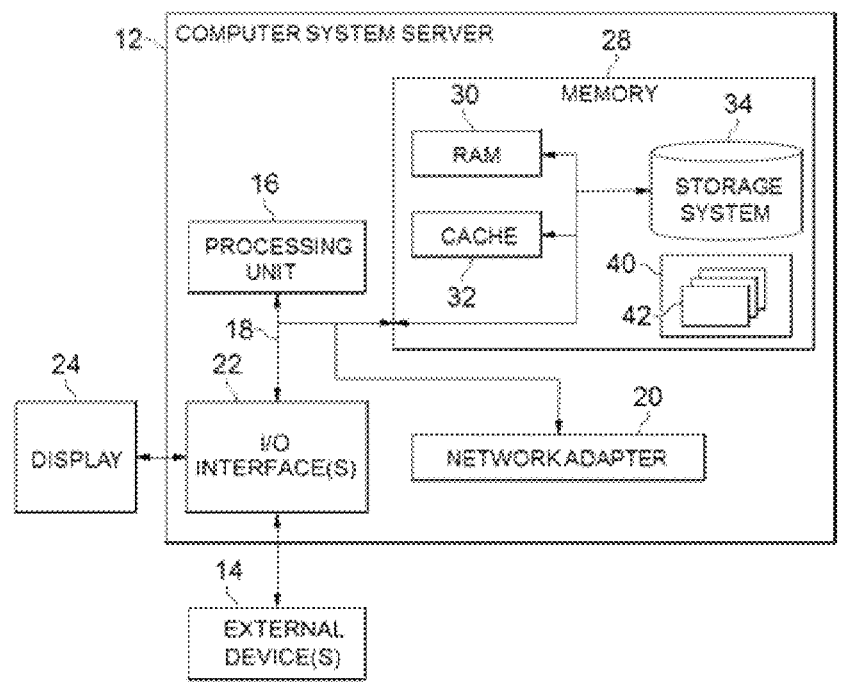
FIG. 1 schematically illustrates an example computer system/server 12 which is applicable to implement embodiments of the present invention.

Reference is first made to FIG. 1, in which an example electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It would be appreciated that the computer system/server 12 illustrated in FIG. 1 is only an example for implementing one embodiment of the present invention. In another embodiment of the present invention, other computing devices may be adopted, for example, the data sharing may be implemented at any of the servers that host the Web application.

Figure 2:
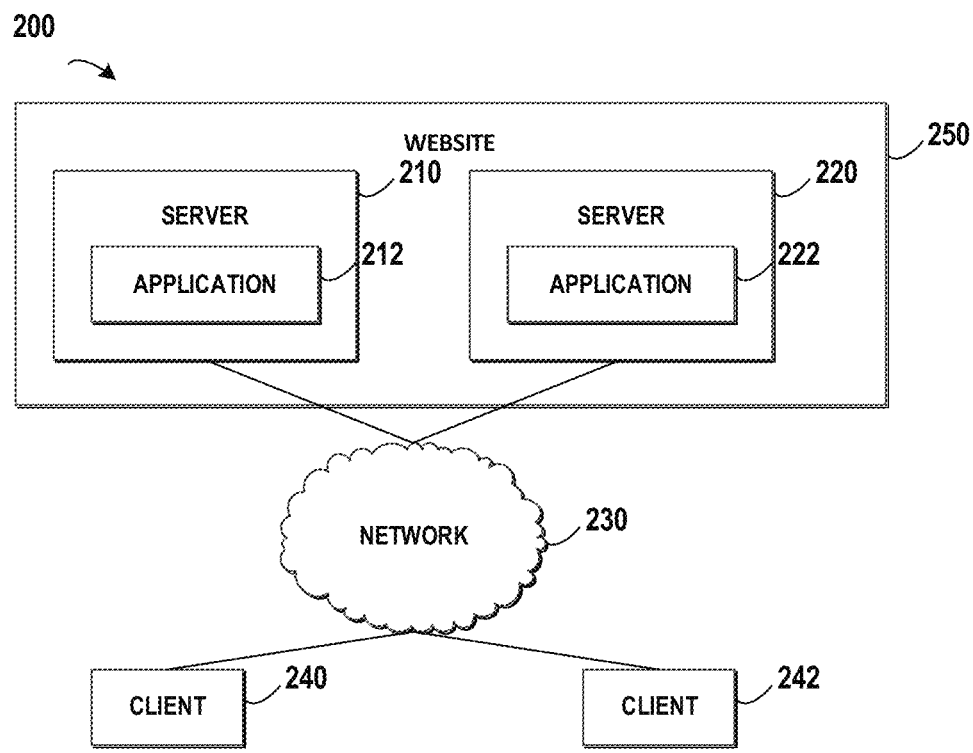
FIG. 2 schematically illustrates a network environment according to one embodiment of the present invention.

FIG. 2 schematically illustrates a network environment according to one embodiment of the present invention. A website 250 includes a server 210 and a server 220. In this figure, an application 212 is hosted on the server 210 and an application 222 is hosted on the server 220. Further, the clients such as a client 240, and client 242 access the applications hosted on different servers via a network 230. In this environment, if common data is shared between the applications 212 and 222, then additional effort is required to manage the distribution of the common data.

For example, the application 212 for user management is written in JAVA™ by Company A, and the application 222 for credit management is written in C++ by Company B. Usually, the common business logic is shared between applications 212 and 222. For example, the business logic for checking whether the age of a user is greater than a threshold such as 20 is shared. According to the prior art approach, if the telecommunication changes the threshold in the business logic, then Companies A and B have to rewrite the code segment in the application 212 and application 222 respectively.

According to one proposed approach, the common business logic is extracted from the applications. Then, a central service is setup for distributing the common business logic to various applications associated with the common logic. In this approach, the central service should ensure that the common logic is distributed to all the associated applications and that the common logic at all the associated applications is consistent. Although this approach is beneficial in managing complex business logic, it is an expensive and time-consuming procedure for sharing the light business logic such as checking the user's age. If the light business logic is shared among multiple applications according to the above approach, heavy workloads may be caused to the central service.

Figure 3:
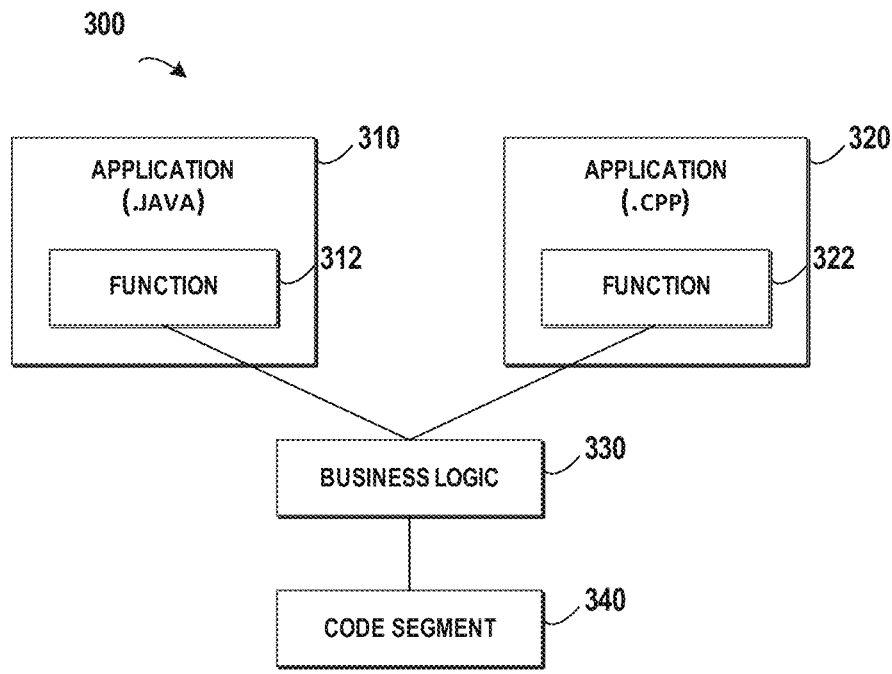
FIG. 3 schematically illustrates a block diagram for generating and sharing a code segment associated with business logic for an application according to one embodiment of the present invention.

In view of the above, it is desired to provide a convenient and simple approach for sharing light business logic among multiple applications. According to one embodiment of the present invention, code segment related to the common business logic is not directly written in the application. Instead, the code related to the common business logic is defined as a separated code segment external to the application. During the operation of the application, the code segment is invoked by executing the application. FIG. 3 schematically illustrates a block diagram for generating and sharing a code segment associated with business logic for an application according to one embodiment of the present invention.

As illustrated in FIG. 3, an application 310 including a function 312 is written in Java™, and an application 320 including a function 322 is written in C++. The functions 312 and 322 are associated with the common business logic 330, and these functions act as portals for invoking the code segment 340, respectively. In one embodiment of the present invention, the code segment 340 is shared between the applications 310 and 320 such that the applications 310 and 320 call the functions 312 and 322 respectively in running these two applications. As the code segment 340 records the code for the common business logic, distributing the code segment 340 to each of the applications 310 and 320 will ensure that each of the applications implements the common business logic.

Although each of the applications illustrated in FIG. 3 includes only one function (for example, the application 310 includes the function 312 and the application 320 includes the function 322), in another example, the application may include multiple functions associated with different business logic. For example, the application 310 may include a further function 312 and the application 320 may include a further function 322 (not illustrated in FIG. 3), where the functions 312 and 322 may share a further business logic.

For example, if both of the applications 310 and 320 call the common business logic for removing all the white spaces in a user input string and converting the string into lower case, then a common code segment as illustrated in Table 1 may be coded. Although the example code segment is written in Java™ script, other programming languages may be used in another embodiment.

TABLE 1

Example Code Segment function normalize_input(input){
 var str = input.replace(/ /g,'');
 return str.toLowerCase( );
}

In another example, if the common business logic relates to displaying an additional message on the browser for customers who are located in City A, then the code segment may be defined as illustrated in Table 2.

TABLE 2

Example Code Segment function getWelcomeMessage(customer) {
 if (customer.getLocation == 'City A') {
  message = 'New product ABC is now available for City A!'
  return message;
}

Figure 4:
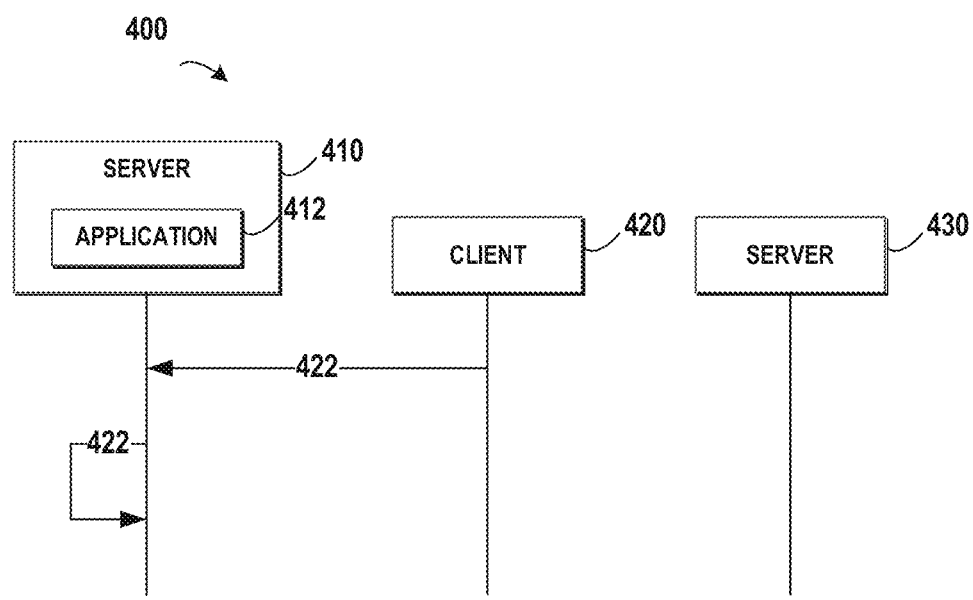
FIG. 4 schematically illustrates a diagram for sharing code segment between multiple servers according to one embodiment of the present invention.

FIG. 4 schematically illustrates a diagram for sharing code segment between multiple servers according to one embodiment of the present invention. According to one embodiment of the present application, a code segment is obtained (422) at a first server 410 from a client 420 in response to the client 420 interacting with a first application 412 hosted on the first server 410, where the code segment is associated with business logic in the first application 412. Then, the first application 412 is executed (422) based on the obtained code segment. Accordingly, the code segment may be distributed to multiple servers upon the client accessing one of the multiple servers such as server 430.

In this embodiment, the code segment associated with the business logic of the first application is provided in a client in advance, and then the code segment is transmitted from the client to the first server when the client is interacting with the first server. As the online services of the website are implemented by multiple applications hosted on multiple servers, when the client accesses the website, based on the organization of the website, actually the client is interacting with the multiple servers included in the website. Accordingly, the code segment provided on the client will be distributed to the multiple servers upon the client accessing one of the multiple servers. Compared to the traditional approach of additionally providing the central service for distributing the code segment to the multiple servers, code segment is shared to multiple servers of the website via the client according to the present invention.

Figure 5:
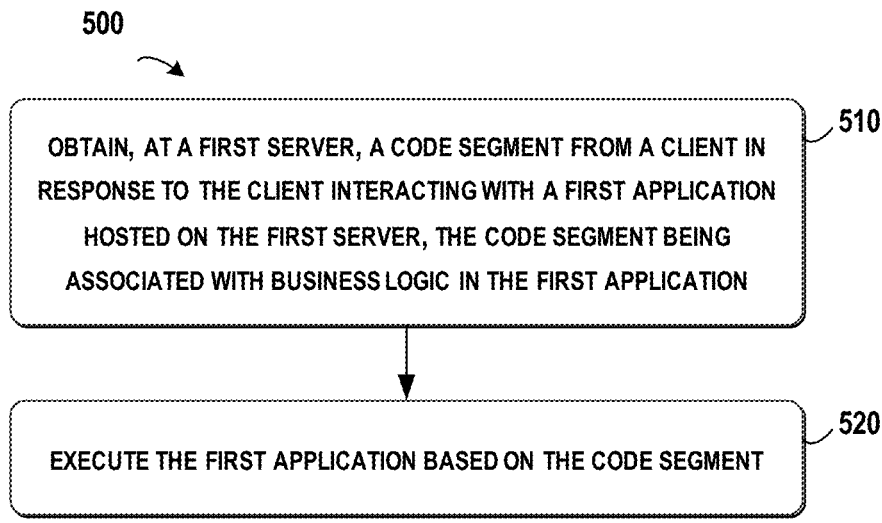
FIG. 5 schematically illustrates a flowchart of a method for sharing code segment according to one embodiment of the present invention.

FIG. 5 schematically illustrates a flowchart of a method for sharing code segment according to one embodiment of the present invention. In Step 510, a code segment is obtained at a first server from a client in response to the client interacting with a first application hosted on the first server, where the code segment is associated with business logic of the first application. In this step, the code segment is in advance provided to the client, and the present embodiment does not care about how to provide the code segment to the client. For example, the code segment may be obtained from another server, or generated at the client.

In Step 520, the first application is executed based on the code segment. In this step, the code segment is called by the first application. The code segment is interpreted into executable code together with the code of the first application.

In one embodiment of the present invention, the first server may be associated with a domain of a first Hyper Text Transport Protocol (HTTP) cookie, and the code segment may be received at the first server via the first HTTP cookie. In this embodiment, the code segment is encoded into the HTTP cookie and the cookie is automatically carried from the client to the first server during an interaction according to HTTP. In other words, once the code segment is encoded into the cookie, the cookie is treated as a common HTTP cookie. As all the subsequent operations performed to the cookie follow the specifications defined in HTTP, no extra workloads are required in distributing the code segment to another server.

Usually, hundreds of or even thousands of clients access the multiple servers of the website at every moment. Once the code segment is provided to one client, the cookie encoded with the code segment will be immediately transmitted to other servers of the website along with the HTTP communication between the client and the other servers.

Single sign-on (SSO) is a popular technique adopted in the design of the website. SSO provides a property of access control of multiple related, but independent software systems. In the embodiments of the present invention, the multiple servers of the website may be considered as related but independent software systems. With SSO, once a client logs in one server of the website, this client gains access to all servers without being prompted to a login interface when accessing each of the servers. As the domain of the cookie is associated with the login hierarchy of the website, the domain of the cookie may be considered in the embodiments of the present invention so as to accelerate the distribution of the cookies.

In one embodiment of the present invention, the code segment may be received from the client in response to the first server being associated with the domain of the first HTTP cookie. For example, the website includes a first server and a second server. The domain of the website may be represented as "www.xyz.com," and the domains of the first and second servers may be represented as "a.xyz.com" and "b.xyz.com," respectively. If the website supports SSO, then the client logged in the first server is automatically permitted to access the second server, vice visa.

According to HTTP, if the domain of a receiving server domain is associated with the domain of the domain of a HTTP cookie (for example, in the peer domain or sub-domain), then the client will automatically send the HTTP cookie to the receiving server. In this embodiment, the domain of the first server is a sub-domain, thus the first HTTP cookie is automatically sent from the client to the first server. Accordingly, the code segment carried in the first HTTP cookie is received at the first server.

At this point, if the client on which the code segment is located accesses the first server according to HTTP, then the code segment is transmitted from the client to the first server. Further, as the website supports SSO, the client is automatically permitted to access the second server, and thus the cookie is automatically transmitted to the second server. Accordingly, the code is transmitted from the client to the second.

In one embodiment of the present invention, the code segment may be encoded into a second HTTP cookie by the second server, and then the code segment may be received by the client from a second HTTP cookie during an interaction between the client and the second server.

Various encoding algorithms may be adopted in encoding the code segment into the cookie. For example, Base64 encoding schemes may be adopted. Base64 is a group of similar binary-to-text encoding schemes that represent binary data in an ASCII string format by translating it into a radix-64 representation. Base64 encoding schemes are commonly used where there is a need to encode binary data that needs to be stored and transferred over media that is designed to deal with textual data. Base 64 encoding ensures that the data remains intact without modification during transport. Referring back to Table 1, the code segment may be encoded to a string as illustrated in Table 3. Although Base64 is taken as an example encoding algorithm in describing the embodiment, another appropriate algorithm may be adopted as long as it may encode the code segment into the cookie.

TABLE 3

Encoded String

ZnVuY3Rpb24gbm9ybWFsaXplX2lucHV0KGlucHV0KXsNCiAgICB2
YXIgc3RyID0gaW5wdXQucmVwbGFjZSgvIC9nLCcnKTsNCiAgICBy
ZXR1cm4gc3RyLnRvTG93ZXJDYXNlKCk7DQp9DQo=

Figure 6:
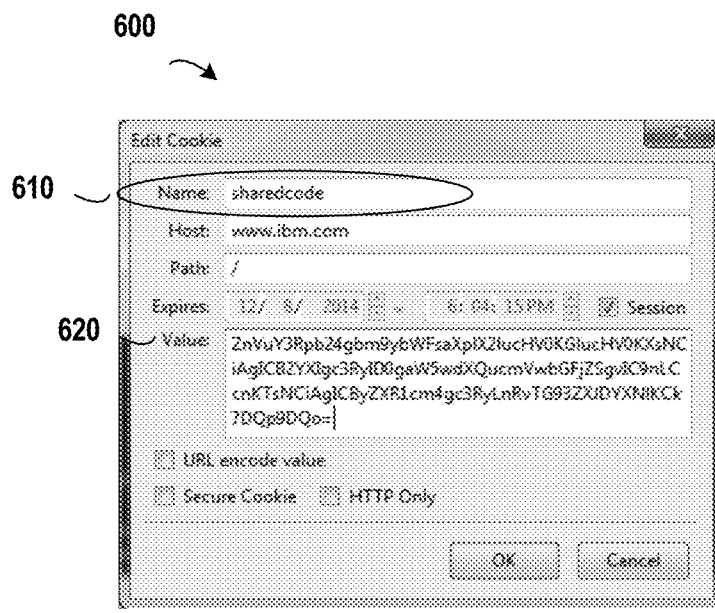
FIG. 6 schematically illustrates a dialog for generating a code segment according to one embodiment of the present invention.

Reference is made to FIG. 6 to further describe how to load the Base64 string into the HTTP cookie. FIG. 6 schematically illustrates a dialog for generating a code segment according to one embodiment of the present invention. A dialog 600 illustrates a tool for editing the cookie. In the dialog 600, the name of the cookie (for example, "sharedcode") may be defined in a name field 610, and the encoded string illustrated in Table 3 may be input into the value field 620.

Although "sharedcode" is illustrated in FIG. 6 as an example name, another name may be defined in the dialog 600. For example, another name "sharedcode2" may be input in the name field 610 to load another Base64 string. Further, the example code segment in Table 2 may be encoded into another string, and then the other string may be input in the value field 620.

In one embodiment of the present invention, the code segment may be received via a second HTTP cookie by the client from a second server that hosts a second application, and business logic of the second application may be identical to the business logic of the first application. With this embodiment, the code segment may be provided to the client from one of the servers of the website, then the code segment may be transmitted to the first server which has the same business logic as that of the one provided with the code segment. Compared with the conventional approach, no central service is setup for distributing the code segment among the multiple servers of the website. Instead, the code segment associated with the common business logic is distributed to the servers via the client.

In one embodiment of the present invention, executable code may be generated by interpreting the obtained code segment. Then, the executable code may be invoked at the first server in response to the first application being executed. As the code segment is encoded into the string and inserted in the cookie obtained to the first server, the string needs to be decoded to recover the original code segment for further processing. Example code called at the first server is illustrated in Table 4.

TABLE 4

Example Code

String code = getCookieByName ("sharedcode");
// to read cookie whose name is 'sharedcode'
code = base64Decode(code);
// to decode the base64 string
Customer cust = getCurrentUser( );
// to get current log in user object;
String message = runScriptFromCookie (code,
convertCustomerObject (cust));
// to run the Javascript code extracted from cookie,
// using Javascript engine from server side Based on above example code, the string encoded in the cookie may be extracted from the cookie by a function getCookieByName ("sharedcode"), and then the string is decoded back to the code segment. The decoding step is an inverse operation of the encoding step, and it converts the string as illustrated in Table 3 back to the code segment as illustrated in Table 1. Next, the code segment may be run by a Java' script engine at the first server in running the first application.

In one embodiment of the present invention, the code segment may be further sent to a second client at the first sever. As described in the above, embodiments of the present invention take advantage of the routine HTTP communication between the client and multiple servers of the website. Specifically, the code segment is encoded in the cookie that is to be transmitted to and from the client and multiple servers. Accordingly, the common business logic may be distributed among the multiple servers without dedicated communication for sharing the common business logic.

In one embodiment of the present invention, the code segment may be encoded into a third HTTP cookie. Then, the third HTTP cookie may be sent to the second client.

In this embodiment, the code segment associated with the common business logic is encoded into the HTTP cookie and thus is distributed among multiple servers with the spread of the HTTP cookie. It would be appreciated that transmitting the cookie between the clients and the server is automatically implemented according to HTTP, thereby causing no additional workloads to the client and the servers. In this embodiment, once the code segment is received on the first server, it may be automatically sent to another client connected with the first server. Further, the code segment encoded in the cookie may be propagated with the spread of the cookie in response to an HTTP communication between the other client and another server. With the above procedure, the code segment associated with the common business logic is quickly distributed among the multiple servers of the website.

In one embodiment of the present invention, the code segment may be updated at the first server in response to a change in the business logic of the first application. Then, the updated code segment may be sent to the client. As the code segment associated with the common business logic is external to the applications on the multiple servers, the code segment may be easily modified when the business logic is changed.

If the common business logic changes, the code segment will be updated. The updating step may be implemented at any of the servers of the website or at another computing node, as long as the updated code segment may be provided to the client and/or one of the servers. Once the code segment is updated, the updated code segment may be provided to a client. At this point, the updated code segment at the client may be carried in the cookie and distributed to another server. Alternatively, the updated code segment may be provided to a server, and then the updated code segment may be carried in the cookie and then transmitted to a client. In turn, the updated code segment at the client may be distributed to other servers.

Referring back to Table 2, if the content of the additional message displayed on the browser changes (for example, the message changes to "New product XYZ is now available for City A!"), then the updated code segment is illustrated in Table 4.

TABLE 4

Example Code Segment function getWelcomeMessage(customer) {
  if (customer.getLocation == 'City A') {
  message = 'New product XYZ is now available for City A!'
  return message;
}

Then the updated code segment may be encoded into an HTTP cookie and then sent to a client according to an HTTP communication between the client and the first server.

Figure 7:
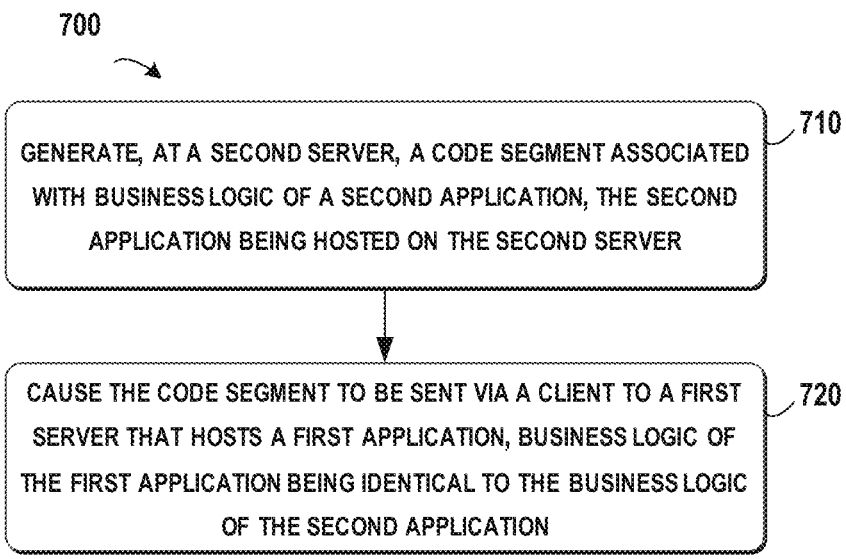
FIG. 7 schematically illustrates a flowchart of a method for sharing code segment according to another embodiment of the present invention.

FIG. 7 schematically illustrates a flowchart of a method for sharing code segment according to another embodiment of the present invention. In Step 710, a code segment associated with business logic of a second application is generated at the second server, where the second application is hosted on the second server. Referring back to Tables 1 and 2, the code segment as illustrated in Tables 1 and 2 may be generated. In Step 720, the code segment is caused to be sent to a first server that hosts a first application, where business logic of the first application being identical to the business logic of the second application. In this step, the code segment is transmitted via the client from the first server to another server of the website.

In one embodiment of the present invention, the code segment may be encoded into a HTTP cookie. Then, the cookie may be caused to be sent to the first server via the client. The encoding step is similar to the procedure described with reference to FIG. 6, and details are omitted herein.

In one embodiment of the present invention, the code segment may be updated in response to a change occurring in the business logic of the second application. Then, the updated segment may be caused to be sent to the first server via the client.

In one embodiment of the present invention, a third code segment may be obtained at the second server from a client in response to the client interacting with the second application. In this embodiment, the third code segment may be associated with business logic of the second application. Then, the second application may be executed based on the third code segment.

Figure 8:
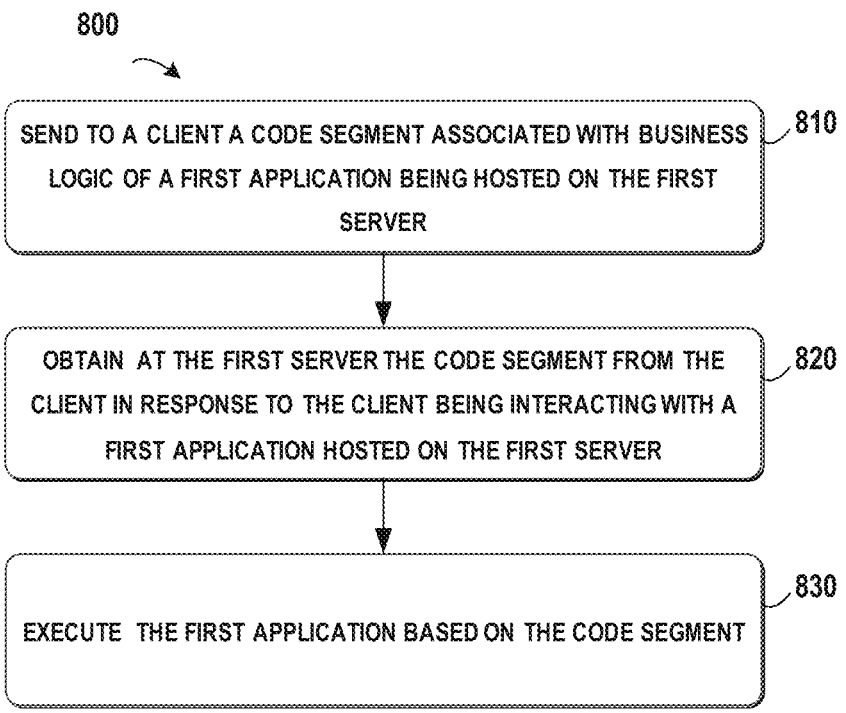
FIG. 8 schematically illustrates a flowchart of a method for sharing code segment according to one embodiment of the present invention.

FIG. 8 schematically illustrates a flowchart of a method for sharing code segment according to one embodiment of the present invention. In Step 810, a code segment associated with business logic of a first application being hosted on the first server is sent to a client. In Step 820, the code segment is obtained at the first server from the client in response to the client being interacting with a first application hosted on the first server. In Step 830, the first application is executed based on the code segment.

Referring back to FIG. 2, the applications 212 and 222 share the common business logic, and the code segment associated with the common business logic is generated. In this example, the code segment is generated at the server 210, or the code segment is generated at another computing device and then provided to the server 210. At this point, if the application 212 is accessed, then the application 212 is executed based on the code segment on the server 210. Then, during the interaction between the client 240 and the server 210, the code segment is sent to the client 240 from the server 210 via the network 230. At this point, the code segment is encoded in the cookie and then the cookie is transmitted in the routine HTTP communication between the server 210 and the client 240.

Next, the code segment encoded in the cookie is sent from the client 240 to the server 220. At this point, the cookie is transmitted in the routine HTTP communication between the client 240 and the server 220. Further, when the application 222 in the server 220 is accessed by a client (either the client 240 or the client 242), the application 222 is executed based on the code segment sent to the server 220.

It would be appreciated that the path of the code segment transmitted among the servers and clients is just an example. In another example, the path may be "the server 210→the client 242→the server 220." In still another example, the path may be "the server 220→the client 240→the server 210."

Moreover, although descriptions are provided with one code segment as an example, multiple code segments may be involved in the embodiment of the present invention. For example, a first code segment for removing the white spaces in the user input (as illustrated in Table 1) is provided to the server 210, and then the first code segment is provided to the server 220 via the client 240. Further, a second code segment for displaying the additional message (as illustrated in Table 2) is provided to the server 220, and then the second code segment is provided to the server 210 via the client 242.

Although only two servers are illustrated in the website in the embodiments of the present invention, the embodiments may be applied to a website including more servers. Further, more clients may be involved in the embodiments. For example, the website may include tens of servers located at different city. The code segments may be first provided to one of the servers. When multiple clients access the server, the code segments may be transmitted to the multiple clients, and then the code segments may be transmitted from the multiple clients to the servers being communicating with the multiple. Further, the above procedure may be repeated and the code segments may be transmitted to all the servers quickly.

According to embodiments of the present invention, data such as code segment associated with common business logic may be distributed among multiple servers of the website in a convenient and simple manner without providing a central service. With the embodiments of the present invention, the code segment is carried in the HTTP cookie and automatically distributed to multiple servers according to the routine HTTP communication between the client and the servers.

Although the embodiments of the present invention are described by taking the common business logic as the example, the shared data is not limited to the common business logic, but may be any type of data that is to be shared among multiple servers. For example, a common configuration file may be encoded into the cookie and then distributed to the multiple servers.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same invention concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present invention. The apparatus/system described in the present invention comprises several means or modules, the means or modules configured to execute corresponding steps. Upon reading this specification, those skilled in the art may understand how to write a program for implementing actions performed by these means or modules. Since the apparatus/system is based on the same invention concept as the method, the same or corresponding implementation details are also applicable to means or modules corresponding to the method. As detailed and complete description has been presented above, the apparatus/system is not detailed below.

According to one embodiment of the present invention, a computing system is proposed. The computing system comprises a computer processor coupled to a computer-readable memory unit, the memory unit comprising instructions that when executed by the computer processor implements a method. In the method, a code segment is obtained at a first server from a client in response to the client interacting with a first application hosted on the first server, where the code segment is associated with business logic in the first application. Then, the first application is executed based on the code segment.

In one embodiment of the present invention, the first server may be associated with a domain of a first Hyper Text Transport Protocol (HTTP) cookie, and the code segment may be obtained at the first server via the first HTTP cookie.

In one embodiment of the present invention, executable code may be generated by interpreting the obtained code segment. Then, the executable code may be invoked in response to the first application being executed.

In one embodiment of the present invention, the code segment may be received via a second HTTP cookie by the client from a second server that hosts a second application, business logic of the second application being identical to the business logic of the first application.

In one embodiment of the present invention, at the first server, the code segment may be send to a second client at the first server.

In one embodiment of the present invention, the code segment may be updated at the first server in response to the business logic in the first application being changed. Then, the updated code segment may be sent at the first server to a second client.

According to one embodiment of the present invention, a computer program product is proposed. The computer program product is tangibly stored on a non-transient machine-readable medium and comprising machine-executable instructions. The instructions, when executed on an electronic device, cause the electronic device to: obtain, at a first server, a code segment from a client in response to the client interacting with a first application hosted on the first server, the code segment being associated with business logic in the first application; and execute the first application based on the code segment.

In one embodiment of the present invention, the first server may be associated with a domain of a first Hyper Text Transport Protocol (HTTP) cookie, and the instructions may further cause the electronic device to: receive the code segment at the first server via the first HTTP cookie.

In one embodiment of the present invention, the instructions further cause the electronic device to: generate executable code by interpreting the obtained code segment; and invoke the executable code in response to the first application being executed.

In one embodiment of the present invention, the code segment may be received via a second HTTP cookie by the client from a second server that hosts a second application, and business logic of the application may be identical to the business logic of the first application.

In one embodiment of the present invention, the instructions further cause the electronic device to: send the code segment to a second client at the first sever.

In one embodiment of the present invention, the instructions further cause the electronic device to: update, at the first server, the code segment in response to the business logic in the first application being changed; and send, at the first server, the updated code segment to a second client.

According to one embodiment of the present invention, a computing system is proposed. The computing system comprises a computer processor coupled to a computer-readable memory unit, the memory unit comprising instructions that when executed by the computer processor implements a method. In the method, a code segment associated with business logic of a second application is generated at a second server, where the second application is hosted on the second server. Then, the code segment is caused to be sent via a client to a first server that hosts a first application, where business logic of the first application is identical to the business logic of the second application.

In one embodiment of the present invention, the cookie may be caused to be sent via the client to the first server according to the HTTP.

In one embodiment of the present invention, the code segment may be updated in response to a change in the business logic of the second application. Then, the updated segment may be caused to be sent to the first server via the client.

In one embodiment of the present invention, a third code segment to the second server from a client in response to the client interacting with the second application may be obtained at the second server, where the third code segment is associated with business logic of the second application. Then, the second application in the second application may be executed based on the third code segment.

According to one embodiment of the present invention, a computer program product is proposed. The computer program product is tangibly stored on a non-transient machine-readable medium and comprising machine-executable instructions. The instructions, when executed on an electronic device, cause the electronic device to: generate at a second server a code segment associated with business logic of a second application, where the second application is hosted on the second server; and cause the code segment to be sent via a client to a first server that hosts a first application, where business logic of the first application is identical to the business logic of the second application.

In one embodiment of the present invention, the instructions further cause the electronic device to: encode the code segment into a HTTP cookie; and cause the HTTP cookie to be sent via the client to the first server.

In one embodiment of the present invention, the instructions further cause the electronic device to: update the code segment in response to a change in the business logic of the second application; and cause the updated segment to be sent to the first server via the client.

In one embodiment of the present invention, the instructions further cause the electronic device to: obtain a third code segment at the second server from a client in response to the client interacting with the second application, where the third code segment is associated with business logic of the second application; and execute the second application based on the third code segment.

Moreover, the system may be implemented by various manners, including software, hardware, firmware or a random combination thereof. For example, in some embodiments, the apparatus may be implemented by software and/or firmware. Alternatively or additionally, the system may be implemented partially or completely based on hardware. for example, one or more units in the system may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system comprising a computer processor coupled to a computer-readable memory unit, the memory unit comprising instructions that when executed by the computer processor implements a method comprising:

program instructions to receive from a third-party computing device, by a first server, a first code segment associated with business logic of a first application hosted on the first server in response to a client interacting with the first application, wherein the first server is associated with a domain of a first Hyper Text Transport Protocol (HTTP) cookie and with single sign on (SSO) domain Hierarchy;

program instructions to update the first code segment, at the first server, in response to a change in the business logic of the first application;

program instructions to distribute the business logic among the first and a second server;

program instructions to encode the first code segment, using string code, into a first HTTP cookie using Base64 scheme by loading a Base64 into the first HTTP cookie;

program instructions to generate, by the second server, a second code segment associated with business logic of a second application hosted on the second server, wherein the business logic of the first application hosted on the first server is the same as the business logic of the second application hosted on the second server;

program instructions to encode the second code segment, using string code, into a second HTTP cookie using Base64 scheme by loading a Base64 into the first HTTP cookie;

program instructions to send, by the second server, the encoded second code segment to the first server;

program instructions to decode, by the first server, the encoded second code segment by extracting and decoding string code, wherein the decoding is an inverse operation of the encoding the second code segment;

program instructions to execute, by the first server, the first application based on the second code segment, wherein the second code segment is executed by a JavaScript engine at the first server in running of the first application;

program instructions to obtain, by the second server, a third code segment from the client in response to the client interacting with the second application; and program instructions to execute, by the first server, the second application based on the third code segment.

* * * * *